(12) United States Patent
Vitek et al.

(10) Patent No.: US 10,271,300 B2
(45) Date of Patent: Apr. 23, 2019

(54) METHOD AND SYSTEM FOR DETERMINING A LOCATION OF WIRELESS DEVICE

(71) Applicant: Aruba Networks, Inc., Sunnyvale, CA (US)

(72) Inventors: Clark Vitek, Vancouver, WA (US); Venkatesh Kannan, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/876,166

(22) Filed: Jan. 21, 2018

(65) Prior Publication Data

US 2018/0146449 A1 May 24, 2018

Related U.S. Application Data

(63) Continuation of application No. 15/295,622, filed on Oct. 17, 2016, now Pat. No. 9,907,045, and a continuation of application No. 13/829,694, filed on Mar. 14, 2013, now Pat. No. 9,474,039.

(51) Int. Cl.
*H04W 64/00* (2009.01)
*H04B 17/318* (2015.01)
*H04W 84/12* (2009.01)

(52) U.S. Cl.
CPC .......... *H04W 64/00* (2013.01); *H04B 17/318* (2015.01); *H04W 84/12* (2013.01)

(58) Field of Classification Search
CPC ... G06K 7/10722; H01Q 1/246; H01Q 1/2266
USPC ........ 455/90.2, 11.1, 522, 436, 422.1, 456.6, 455/456.2; 342/373, 451
See application file for complete search history.

(56) References Cited

U.S. PATENT DOCUMENTS

| 8,359,023 B2* | 1/2013 | Joko ................. H04B 7/022 455/422.1 |
| 8,374,784 B2 | 2/2013 | Mazium et al. |
| 2002/0082016 A1* | 6/2002 | Obayashi .............. H04B 7/022 455/436 |
| 2006/0025153 A1 | 2/2006 | Inaba |
| 2008/0207226 A1 | 8/2008 | Shen et al. |
| 2009/0103503 A1 | 4/2009 | Chhabra |
| 2009/0209271 A1 | 8/2009 | Reed et al. |
| 2009/0318168 A1 | 12/2009 | Khosravy et al. |
| 2012/0105474 A1 | 5/2012 | Cudalbu |
| 2012/0299774 A1 | 11/2012 | Oyama |

(Continued)

*Primary Examiner* — Kiet M Doan
(74) *Attorney, Agent, or Firm* — Hewlett Packard Enterprise Patent Department (57) ABSTRACT

A system for (a) determining a first direction from a first device toward a second device based on a first set of WiFi® wireless signals received by at least one antenna of the first device from the second device, (b) determining a second direction from a third device toward the second device based on a second set of WiFi® wireless signals received by at least one antenna of the third device from the second device, and (c) based at least on a first location of the first device, the first direction from the first device toward the second device, a second location of the third device, and the second direction from the third device toward the second device: determining a third location of the second device.

15 Claims, 3 Drawing Sheets

(56) References Cited

U.S. PATENT DOCUMENTS

2013/0079027 A1    3/2013   Hand et al.
2014/0022050 A1    1/2014   Dua

* cited by examiner

METHOD AND SYSTEM FOR DETERMINING A LOCATION OF WIRELESS DEVICE

This application is a Continuation of U.S. patent application Ser. No. 15/295,622 filed on Oct. 17, 2016 (issued as U.S. Pat. No. 9,907,045 on Feb. 27, 2018), which is a Continuation of U.S. patent application Ser. No. 13/829,694 filed on Mar. 14, 2013 (issued as U.S. Pat. No. 9,474,039 on Oct. 18, 2016), the content of which are incorporated herein by reference in its entirety. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to determining a location of a wireless device. In particular, the present disclosure relates to determining the location of a wireless device based on WiFi® (WiFi® is a registered trademark of WiFi® Alliance) signals received from the wireless device.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

Devices within WLANs communicate wirelessly pursuant to the 802.11 standard with other devices within the WLAN to request, grant, provide, and/or receive access to network resources. Furthermore, three devices within the WLAN may receive WiFi® signals from a particular device and determine a signal strength of the received signals. Conventionally, the signal strength of the received signals is only used to determine a distance between the transmitting device and receiving devices. A general area where a transmitting device is located may be determined based on the distances from each of the receiving devices.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention. The detailed description includes the following sections:

1. GENERAL OVERVIEW
2. ARCHITECTURAL OVERVIEW
3. DETERMINING A LOCATION OF A TRANSMITTING DEVICE BASED AT LEAST ON A DIRECTION TOWARD THE TRANSMITTING DEVICE FROM RECEIVING DEVICES
4. DETERMINING A LOCATION OF A TRANSMITTING DEVICE BASED AT LEAST ON (i) A DIRECTION TOWARD THE TRANSMITTING DEVICE FROM AN ACCESS POINT AND (ii) A DISTANCE BETWEEN THE TRANSMITTING DEVICE AND THE ACCESS POINT.
5. ORIENTING DIRECTIONAL FOCUS FOR ANTENNAS OF RECEIVING DEVICES
6. DETERMINING A LOCATION OF AN ACCESS POINT
7. MODIFYING A RADIATION PATTERN BY MODIFYING A PHYSICAL CONFIGURATION OF ANTENNAS USING AN EXTERNAL COMPONENT
8. MISCELLANEOUS; EXTENSIONS

1. General Overview

In an embodiment, a location of a particular device is determined based on WiFi® signals received by one or more other devices. The WiFi® signals are received by the other devices using at least one directional antenna and/or at least one adaptive array antenna.

In an embodiment, a location of a transmitting device is determined by two or more devices by determining a direction toward the transmitting device from each of the two or more devices based on WiFi® signals received by the two or more devices from the transmitting device. The location of the transmitting device is determined based on (i) the location of the two or more devices and (ii) the intersection of respective projections directed toward the transmitting device from the two or more devices.

In an embodiment, a location of transmitting device is determined by a single device (for example, an access point) by (a) determining a direction toward the transmitting device from the access point and (b) a distance between the transmitting device and the access point based on the WiFi® signals received by one or more adaptive array antennas of the single device from the transmitting device.

Embodiments include any combination of determining a direction and/or a distance toward a transmitting device from one or more devices, and determining a location of the transmitting device based on this information.

2. Architectural Overview

One or more embodiments described herein are applicable for determining a location of a wireless device based at least on a direction from which other devices receive WiFi® signals from that wireless device.

A wireless device includes any device that can be configured to communicate wirelessly with another wireless device. Some wireless devices may also be configured to communicate with other devices using a wired connection. The examples herein which refer to a specific type of wireless device (such as an access point or a client device) may be equally applicable to other wireless devices (such as a mesh node or mesh portal). Furthermore, examples referring to a specific type of wireless signal (for example, WiFi® signals) may be equally application other types of wireless signals.

Figure 1:
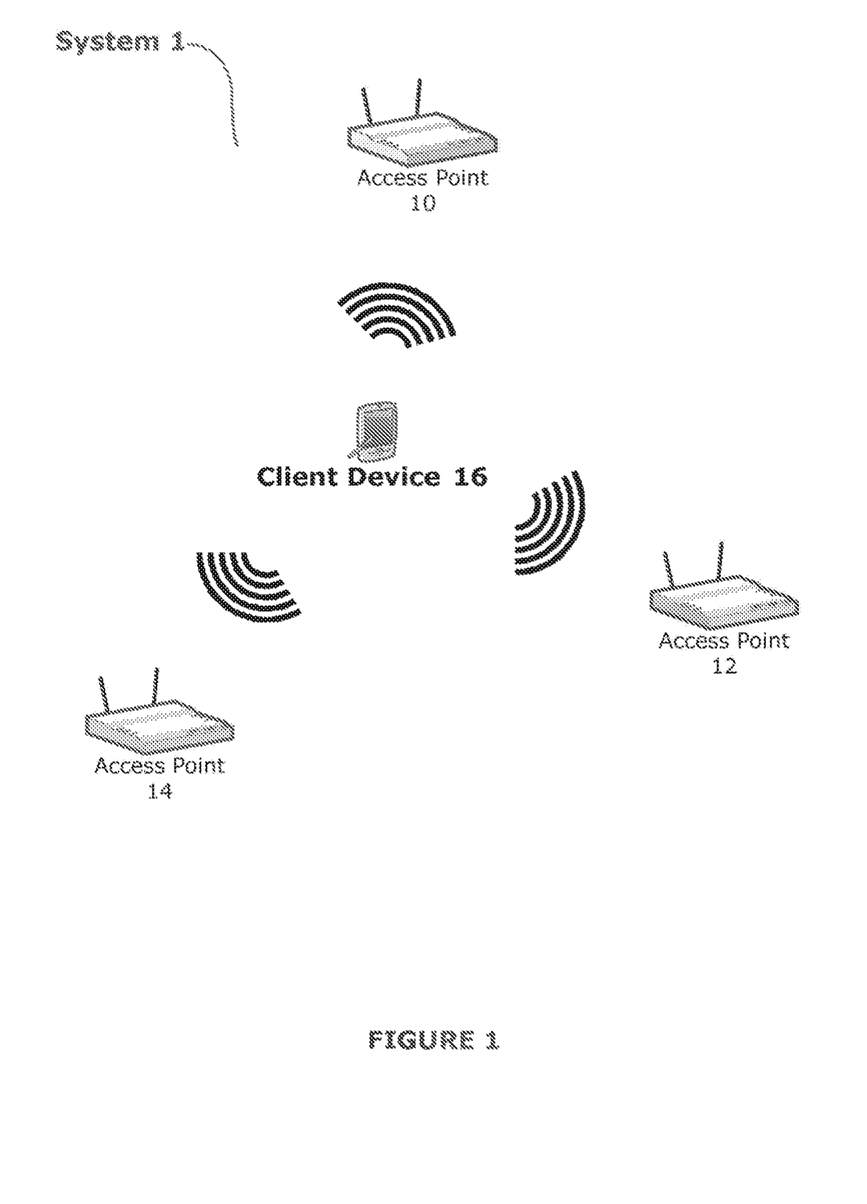
FIG. 1 shows a block diagram example of a system in accordance with one or more embodiments.

FIG. 1 shows a block diagram example of a digital system in accordance with one or more embodiments. Digital System 1, as illustrated in FIG. 1, includes a set of devices that may be connected via one or more networks (for example, a Local Area Network, a Wide Area Network, the Internet, Intranet, etc.). Specific examples of devices (for example, client device 16, access point 10, access point 12, and access point 140) or connections between devices are referred to herein for purposes of clarity. Embodiments are applicable to any type or set of devices such that a location of a particular device is determined based on wireless signals transmitted by the particular device.

In an embodiment, the client device 16 is a digital device that includes a processor, memory hierarchy, and input/output (I/O) interfaces including a wireless interface such as an IEEE 802.11 wireless interface. The wireless interface is configured to communicate with one or more devices (for example, access points). Examples of client device 16 include personal computers, laptop computers, netbook computers, wireless music players, portable telephone communications devices, smart phones, tablets, and digital televisions. The client device 16 is an example of a transmitting device (as referred to herein) which is configured to transmit wireless signals (for example, WiFi® signals).

In an example, the access point 10, access point 12, and access point 14 are network devices. The access points are communicatively coupled to a network via a transmission medium to send and receive data. The access point 10, access point 12, and access point 14 are examples of receiving devices which receive WiFi® signals from the client device 16. Access points are further described below with reference to FIG. 2.

System 1 may include more or less devices, than the devices illustrated in FIG. 1, that may be connected to other devices within System 1 via wired and/or wireless segments. For example, System 1 may include a single access point 10 which is configured to determine a location of client device 16 based on WiFi® signals received from client device 16.

In an example, System 1 may include a controller (or other device) which is configured to communicate with receiving devices (for example, access point 10, access point 12, and access point 14). The controller (not illustrated) may communicatively link an access point to a network.

Operations described herein such as but not limited to determining a direction toward a client device 16 from a receiving device, determining a distance between client device 16 and a receiving device, and/or determining a location of client device 16, may be performed by the controller or by another device.

Figure 2:
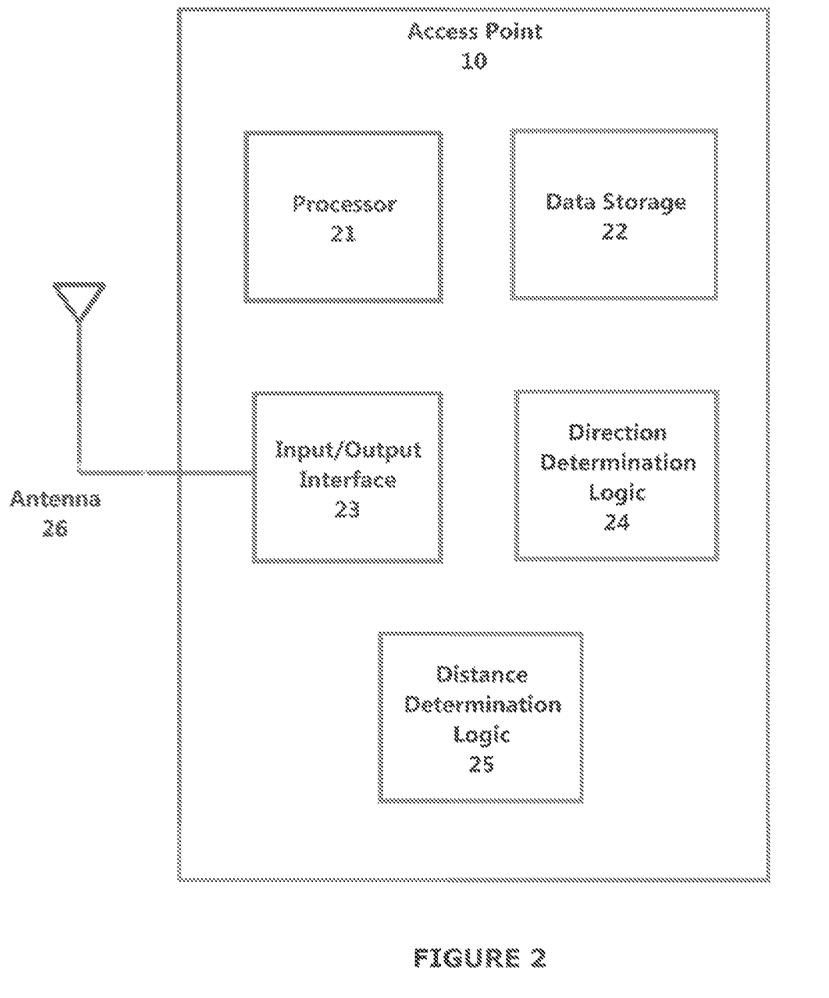
FIG. 2 shows a block diagram example of an access point in accordance with one or more embodiments.

FIG. 2 shows a block diagram example of access point 10 in accordance with one or more embodiments. The access point 10 is a network device that comprises one or more of: a processor 21, data storage 22, an I/O interface 23, a direction determination logic 24, a distance determination logic 25, and an antenna(s) 26. Other access points within System 1 may be configured similarly or differently than access point 10.

The data storage 22 of the access point 10 may include a fast read-write memory for storing programs and data during the access point 10's operations and a hierarchy of persistent memory such as ROM, EPROM, and Flash memory for storing instructions and data needed for the startup and/or operations of access point 10. The data storage 22 stores data that is to be transmitted from the access point 10 or data that is received by access point 10. In an embodiment, the data storage 22 is a distributed set of data storage components.

In an embodiment, the I/O interface 23 corresponds to one or more components used for communicating with other devices via wired or wireless segments. The I/O interface 23 may include a wired network interface such as an IEEE 802.3 Ethernet interface and/or a wireless interface such as an IEEE 802.11 WiFi® interface.

The processor 21 is coupled to the data storage 22 and the I/O interface 23. The processor 21 may be any processing device including, but not limited to a MIPS-class processor, a microprocessor, a digital signal processor, an application specific integrated circuit, a microcontroller, a state machine, or any type of programmable logic array.

In an embodiment, access point 10 includes one or more antennas configured at least to receive WiFi® signals transmitted by client device 16. The WiFi® signals received by the one or more antennas may be used to determine a direction and/or a distance of a transmitting device such as client device 16. In an embodiment, access point 10 includes at least one antenna 26 which may be a directional antenna or an adaptive array antenna.

An adaptive array antenna (may be referred to as a smart antenna) or a directional antenna (may be referred as a beam antenna) are antennas which may radiate greater power in one or more directions than other directions allowing for increased performance in the one or more directions while transmitting or receiving WiFi® wireless signals. Furthermore, use of such an antenna may result in reduced interference from unwanted sources in the other directions. Adaptive array antennas or directional antennas of a receiving device may be used to determine a direction toward a transmitting device and/or a distance between the receiving device and the transmitting device.

In one example, an adaptive array antenna uses various antenna patterns focused on different directions (referred to as beamforming) in both the Elevation (E-plane) and Azimuth (H-plane) to receive Wi-Fi signals from a particular device. Beamforming is a method used to create the radiation pattern of the antenna array by adding constructively the phases of the signals in the direction of a target device (for example, client device 16).

In another example, a directional antenna receives different WiFi® signals, with different corresponding signal strengths, from a transmitting device while the directional antenna is physically directed in different directions. The direction in which a radiation pattern is primarily focused by an adaptive array antenna or a directional antenna is referred to in this application as the "directional focus" of the antenna. The directional focus of adaptive array antennas is electronically controllable.

In an embodiment, the different WiFi® signals received from the transmitting device are received at different signal strengths, the signal strengths being based on a transmit power with which the WiFi® signal was transmitted and the directional focus of antenna 26 of access point 10. Each received WiFi® signal is accordingly associated with a directional focus of antenna 26 with which the WiFi® signal was received from client device 16.

A transmit power refers to the Equivalent Isotropically Radiated Power (EIRP) or Effective Isotropically Radiated Power (EIRP). The transmit power may refer to the amount of power that a theoretical isotropic antenna would emit to produce the peak power density observed in the direction of maximum antenna gain. The transmit power may be expressed in dB-microvolts (dBm) or in decibels above a reference level of one milliwatt (dBm).

A wireless signal loses power as the wireless signal propagates from the client device 16 to the access point 10. As a result of losing power, the access point 10 receives a WiFi® signal at a particular signal strength that is lower than the transmit power with which the WiFi® signal was initially transmitted by the client device 16. The signal strength may further depend on the type and/or directional focus of the antennas of the transmitting device and receiving device.

In an embodiment, the direction determination logic 24 includes one or more functional units implemented using firmware, hardware, software, or a combination thereof for determining a direction from the access point 10 toward client device 16. Although, the direction determination logic 24 is shown as implemented on access point 10, one or more physical or functional components of the direction determination logic 24 may be implemented on a separate device such as a controller. For example, the controller may perform one of the operations based on information identifying received WiFi® signals, a corresponding signal strength, and a corresponding directional focus of the antenna 26 used for receiving the WiFi® signals.

In an embodiment, the distance determination logic 25 includes one or more functional units implemented using firmware, hardware, software, or a combination thereof for determining a distance from the access point 10 to client device 16. Although, the distance determination logic 25 is shown as implemented on access point 10, one or more physical or functional components of the distance determination logic 25 may be implemented on a separate device such as a controller. For example, the controller may perform one of the operations based on information identifying received WiFi® signals and a corresponding signal strength. The information may further include a transmit power with which the WiFi® signals were transmitted or a standard/default transmit power used by devices within System 1.

Figure 3:
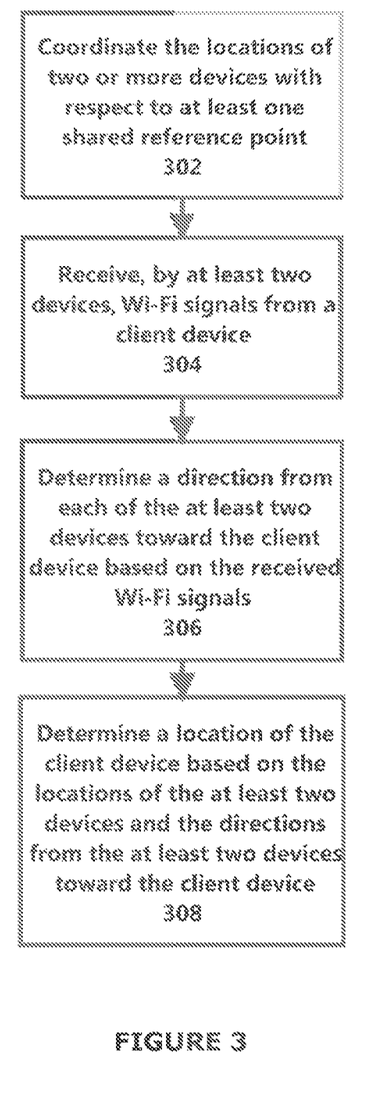
FIG. 3 illustrates an example method for determining a location of a transmitting device in accordance with one or more embodiments.

3. Determining a Location of a Transmitting Device Based at Least on a Direction Toward the Transmitting Device from Receiving Devices FIG. 3 illustrates an example method for determining a location of a transmitting device based at least on a direction toward the transmitting device from a receiving device based on received WiFi® signals in accordance with one or more embodiments. Operations for determining the location, as described herein with reference to FIG. 3, may be omitted, rearranged, or modified. Furthermore, operations may be added or performed by different components or devices. Accordingly, the specific set or sequence of operations should not be construed as limiting the scope of any of the embodiments.

In an embodiment, the locations of two or more devices (for example, access points) are coordinated with respect to at least one shared reference point (Operation 302). The shared reference point may be an actual location or a shared reference frame. A shared reference point includes any information which may be used to compute a location of one of the receiving devices with respect to a location of another receiving device. Examples of shared reference points include but are not limited to:

a. Global Positioning System (GPS) coordinates
b. Latitude and Longitude coordinates
c. A particular location from which devices are referenced (for example, 10 meters at 30 degrees from the particular location and 5 meters south at 270 degrees from the particular location).
d. A location of one of the receiving devices (for example, access point 12 is 15 meters directly northeast of access point 10; in another example, access point 12 is 15 meters in a direction 15 degrees clockwise from a center of a vendor label on access point 10)
e. Building Floor Plan
f. Fixed Objects within an Operating Environment The shared reference point(s) may refer to absolute locations or relative locations. Absolute locations (e.g., GPS coordinates) of receiving devices may be used to determine an absolute location of a transmitting device. Relative locations of two receiving devices may be used to determine a location of a transmitting device relative to the receiving device(s).

In an embodiment, coordinating the locations of two or more devices includes coordinating a direction of one device relative to another device and/or directional focus of an antenna. As stated in the example above, access point 12 is 15 meters in a direction 15 degrees clockwise from a center of a vender label on access point 10.

In an embodiment, an orientation of a receiving device may be based on an installer of the receiving device installing the receiving device in accordance with particular guidelines. For example, a digital compass indicator or a compass rose on an access point may be used by an installer of the access point to point a certain component of each access point in a true North direction. Thereafter, communications received by the access point may be determined to be at a particular direction with relation to that true North direction. The orientation may be in any direction in a 3-dimensional space accordingly to a predetermined scheme in order to coordinate the orientation of different installed devices. The orientation and/or location of other devices may be determined based on the known configuration of one device.

In one example, a distance between two access points may be determined based on one or more WiFi® signals transmitted between the two access points. A first access point 10 transmits a WiFi® signal to a second access point and indicates a transmit power at which the WiFi® signal was transmitted. Based at least on the signal strength of the received signal at the second access point and the transmit power used by the first access point, a loss in signal strength is computed and used to estimate a distance between the two access points.

In an embodiment, at least two devices each using at least one adaptive array antenna or directional antenna receive WiFi® signals from a client device (Operation 304). A client device is used herein as an example for purposes of clarity, however, embodiments are applicable to determining a location of any device based on WiFi® signals received from that device.

In an example, one or more directional antennas or adaptive array antennas of a first device are configured to generate radiation patterns focused in different directions while receiving WiFi® signals from the client device. An adaptive array antenna may generate radiation patterns in different directions by combining elements in a phased array in such a way that signals at particular angles experience constructive interference while others experience destructive interference. A directional antenna may generate radiation patterns in different directions by modification of a physical orientation of the direction antenna. WiFi® signals received by antennas using different directional focus are received with different corresponding signal strengths. In an example, WiFi® signals are received with a high signal strength when the WiFi® signals are received from a transmitting device while a directional focus of the antenna of a receiving device is in a direction toward the transmitting device. In contrast, WiFi® signals are received with lower signal strengths (sometimes not received) when the directional focus of the same antenna of the receiving device is not in a direction toward the transmitting device.

In an embodiment, based on the received WiFi® signals from the client device, a direction toward a transmitting device from each of the at least two devices is determined (Operation 306).

In an example, the signal strengths of received WiFi® signals is compared to identify one or more WiFi® signals with the highest signal strength or with a signal strength above a certain threshold. The directional focus of an antenna when receiving the identified WiFi® signals is used to determine a direction toward the transmitting device.

In another example, average signal strength over different direction intervals is determined and analyzed to identify the direction interval in the direction of the client device. In an example, each of the received WiFi® signals are partitioned into one of twelve buckets based on a directional focus of an antenna when that WiFi® signal was received. The twelve buckets include: 0 to 30 degrees; 30 to 60 degrees; 60 to 90 degrees; 90 to 120 degrees; 120 to 150 degrees; 150 to 180 degrees; 180 to 210 degrees; 210 to 240 degrees; 240 to 270 degrees; 270 to 300 degrees; 300 to 330 degrees; and 330 to 360 degrees. An average signal strength of WiFi® signals associated with each interval is computed and an interval with the highest average signal strength is identified. A center direction of that interval is then determined to be the direction of the client device. In this example, if the average highest signal strength is determined to be associated with the 180 to 210 degree interval, the client device is determined to be at a direction that at 195 degrees from a particular component of the receiving device that is deemed to be at 0 degrees.

For purposes of clarity, the above example describes non-overlapping intervals in a 2-dimensional space. However, embodiments are also applicable to overlapping intervals (for example, 0 to 30 degrees; 10 to 40 degrees; 20 to 50 degrees; etc.) and 3-dimensional intervals (for example, 0 to 30 degrees in the x-y plane and 0 to 40 degrees in the z-plane from the center of an access point or a directional antenna). The use of average signal strength in overlapping intervals to identify a direction toward the client device is advantageous, for example, to remove outliers or erroneous readings.

In an embodiment, a location of a transmitting device is determined based on locations of the receiving devices and respective directions toward the transmitting device from each receiving device (Operation 308). In one example, a projection from a first receiving device toward the transmitting device is intersected with a projection from a second receiving device toward the transmitting device. The intersection point of the projections is determined to be the location of the transmitting device.

4. Determining a Location of a Transmitting Device Based at Least on (i) a Direction Toward the Transmitting Device from an Access Point and (ii) a Distance Between the Transmitting Device and the Access Point In an embodiment, a location of a transmitting device is determined based on Wi-Fi signals received by an access point(s). In an example, WiFi® signals received by a single access point are used to determine (i) a direction toward the transmitting device from the single access point and (ii) a distance between the transmitting device and the single access point.

As described herein, a direction toward a transmitting device from a single access point may be determined based on WiFi® signals received by an adaptive array antenna or a directional antenna of the single access point. In addition to the direction toward the transmitting device, a distance between the single access point and the transmitting device is determined based on a signal strength of the received WiFi® signals. A loss in signal strength is computed by subtracting a signal strength of received WiFi® signals from an actual transmit power for the WiFi® signals or default transmit power associated with the transmitting device. Based at least on the loss in signal strength, a distance between the transmitting device and the single access point is estimated. Additional computations to account for environmental conditions, etc. may be used to obtain more precise distance estimates.

In an embodiment, (i) a direction toward the transmitting device from the single access point and (ii) a distance between the transmitting device and the single access point is used to determine a location of the transmitting device. The location of the transmitting device may be determined relative to the location of the access point. For example, the relative location the transmitting device is determined to be at 30 degrees south of east (based on direction from which WiFi® signals are received) at 10 meters (based on signal strength of received WiFi® signals) from the single access point. In another example, the relative location of the transmitting device with respect to the single access point may be applied to an absolute location of the single access point (e.g., GPS coordinates) to determine the absolute location of the transmitting device (e.g., GPS coordinates).

5. Orienting Directional Focus for Antennas of Receiving Devices

As described above with relation to Operation 302 the locations of two or more devices may be coordinated with respect to at least one shared reference point. The following example relates to coordinating the locations and orienting the directional focus for antennas of receiving devices. Orienting the directional focus of antennas for receiving devices allows for determining how receiving devices are communicatively connected and installed with relation to each other.

In this example, three access points (APs) each have at least one adaptive array antenna which are used to receive WiFi® signals from a target device. A location of the target device is to be determined based on received WiFi® signals in accordance with one or more embodiments. The adaptive array antennas are configured for operation in four primary directions that are 90 degrees separated. The values d1, d2, d3, d4 represent the four directions moving clockwise around the AP from d1.

Since the reference or "seed" AP1 for the matrix has known directions associated with each pattern (d1-d4 in this example) the alignment of each unknown AP (for example, AP2 and AP3) can be determined as an "offset" from the reference. In this example, since AP1$d1$ is "North", if AP2$d1$ shows the greatest signal strength in the AP1 to AP2 matrix it can be determined that AP2$d1$ is facing "South" and the orientation of AP2 is then considered "Known" based on a 1-level comparison (trace) to the reference AP1. Subsequently if AP3 or other APs cannot be directly compared to AP1 due to signal level limitations (i.e. range), then AP3 or other APs can be compared to a second level trace to an AP which has already been classified as known, such as AP2 in this example. This may continue as third, fourth, etc. levels of trace back to the reference AP1 until all orientations are considered "known." As such the reference APs are used to "seed" the matrix with known directions and the "offset" of all unknown APs is determined by scanning the available adaptive antenna patterns to determine which pattern is aligned with which pattern on a "known" AP.

When assisted information is available from other out of band location technologies such as GPS or A-GPS, the locations of the access points are known and the direction relative to each other is also known. By assuming initially all access points are pointed with a reference pattern (e.g. d1) in a reference direction (e.g., "North") the signal level of pattern pairs between APs can be interrogated and compared to the expected result based on the AP locations, distance and assumed orientation.

In an example, GPS data indicates that AP1 and AP2 are 1 km apart and on a bearing of 90 degrees to each other. Based on the GPS data, the maximum signal should be between AP1$d2$ and AP2$d4$. Based on actual data the maximum is found to be between AP1$d1$ and AP2$d4$. Based on this information it is determined that AP1 is installed with AP1$d1$ facing AP2$d4$ instead of AP1$d2$ facing AP2$d4$. A comparison of additional access points and direction pairs may be used to build a matrix of which way each adaptive pattern is facing relative to the other access points. Three access points with definitive directional pairs (e.g., pairs of patterns within range) may be used to solve the matrix.

6. Determining a Location of an Access Point

In an embodiment, a location of an access point is determined based on a location of client devices associated with the access point. Each client device may determine a location of that client device based on data collected by a GPS chip of that client device. The location of client devices associated with an access point is transmitted from the client devices to the access point. Based on a distance between the client devices and the access point and the location of the client devices: a location of the access point is determined. In an example, the GPS coordinates of the access point is determined based on the GPS coordinates of the client devices associated with the access point.

7. Modifying a Radiation Pattern by Modifying a Physical Configuration of Antennas Using an External Component In an embodiment, a radiation pattern generated by an access point may be modified by modifying a physical configuration of one or more antennas of the access point.

In an example, a position of one or more antennas determines the directional focus of a radiation pattern generated by an access point. The position of the one or more antennas may be moved manually or electronically to modify the directional focus of the radiation pattern.

In an embodiment, an access point includes an external physical component that controls the position of one or more antennas of the access point. In an example, a knob on the outside of the access point may be turned to move one or more antennas toward the edge of the access point or away from the edge of the access point (the knob may be connected to a lever which in turn is connected to the one or more antennas). In another example, a switch may be used to select one of two positions for antennas of an access point. Multiple switches, knobs, or other external components may be used to provide individual control of different antennas. Furthermore, components such as switches and knobs may be used to select one of two or more possible positions for at least one antenna of the access point.

In an embodiment, the use of different directional focuses of radiation patterns may be used to receive WiFi® signals from a transmitting device. As described in earlier sections, a direction toward the transmitting device and/or a distance to the transmitting device from a receiving device may be determined based on received WiFi® signals.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
a plurality of network devices, at least one network device of which comprising at least one adaptive array radio antenna used to receive wireless signals from a target device, and a processor that executes instructions from a memory to:
configure a plurality of directions in a coordinate that are separated by an equal degree of angle;
create a two-dimensional matrix, wherein a first dimension of the matrix is determined by a total number of the plurality of network devices, and wherein a second dimension of the matrix indicates a number of adaptive array radio antenna patterns;
select a particular network device from the plurality of network devices as a reference network device, wherein the reference network device supports the number of adaptive array radio antenna patterns, and wherein the plurality of directions associated with the supported number of adaptive array radio antenna patterns are predefined; and
determine a first relative orientation of another of the plurality of network devices relative to the orientation of the reference network device based on the two-dimensional matrix and the predefined plurality of directions associated with the number of adaptive array radio antenna patterns supported by the reference network device;

wherein the plurality of directions comprise four primary direction that are 90 degrees separated.

2. The system of claim 1, wherein the two-dimensional matrix comprises a plurality of signal strength levels corresponding to signals received by the plurality of network devices.

3. The system of claim 2, wherein a respective signal strength level corresponding to a particular network device and a particular available adaptive array radio antenna pattern in the two-dimensional matrix indicates a signal strength of a signal received by the particular network device when the particular network device operates using the particular available adaptive array radio antenna pattern.

4. The system of claim 1, wherein the processor further executes instructions from the memory to:
determine a second relative orientation to the another network device from the plurality of network devices based at least on the two-dimensional matrix and the first relative orientation.

5. The system of claim 1, wherein the processor further executes instructions from the memory to:
receive location information of the reference network device and the another network device from a global positioning system (GPS);
determine a respective reference adaptive array radio antenna pattern and a respective reference direction for the reference network device and the another network device based on the two-dimensional matrix;
estimate an expected signal strength level for a signal received by the reference network from the another network device based on the received location information, the respective adaptive array radio antenna pattern and the respective reference direction for the reference network device and the another network device; and
compare the expected signal strength level with an actual signal strength of the signal received by the reference network device from the another network device.

6. A method comprising:
configuring, by a network device, a plurality of directions in a coordinate that are separated by an equal degree of angel angle;
creating, by the network device, a two-dimensional matrix, wherein a first dimension of the matrix is determined by a total number of the plurality of network devices, and wherein a second dimension of the matrix indicates a number of adaptive array radio antenna patterns;
selecting, by the network device, a particular network device from the plurality of network devices as a reference network device, wherein the reference network device supports the number of adaptive array radio antenna patterns, and wherein the plurality of directions associated with the supported number of adaptive array radio antenna patterns are is predefined; and
determining, by the network device, a first relative orientation of another of the plurality of network devices relative to the orientation of the reference network device based on the two-dimensional matrix and the predefined plurality of directions associated with the number of adaptive array radio antenna patterns supported by the reference network device;
wherein the plurality of directions comprise four primary direction that are 90 degrees separated.

7. The method of claim 6, wherein the two-dimensional matrix comprises a plurality of signal strength levels corresponding to signals received by the plurality of network devices.

8. The method of claim 7, wherein a respective signal strength level corresponding to a particular network device and a particular available adaptive array radio antenna pattern in the two-dimensional matrix indicates a signal strength of a signal received by the particular network device when the particular network device operates using the particular available adaptive array radio antenna pattern.

9. The method of claim 6, further comprising:
determining, by the network device, a second relative orientation to the another network device from the plurality of network devices based at least on the two-dimensional matrix and the first relative orientation.

10. The method of claim 6, further comprising:
receiving, by the network device, location information of the reference network device and the another network device from a global positioning system (GPS);
determining, by the network device, a respective reference adaptive array radio antenna pattern and a respective reference direction for the reference network device and the another network device based on the two-dimensional matrix;
estimating, by the network device, an expected signal strength level for a signal received by the reference network from the another network device based on the received location information, the respective adaptive array radio antenna pattern and the respective reference direction for the reference network device and the another network device; and
comparing, by the network device, the expected signal strength level with an actual signal strength of the signal received by the reference network device from the another network device.

11. A non-transitory machine-readable storage medium encoded with instructions executable by at least one processor of a network device, the machine-readable storage medium comprising instructions to:
configure a plurality of directions in a coordinate that are separated by an equal degree of angel angle:
create a two-dimensional matrix, wherein a first dimension of the matrix is determined by a total number of the plurality of network devices, and wherein a second dimension of the matrix indicates a number of adaptive array radio antenna patterns;
select a particular network device from the plurality of network devices as a reference network device, wherein the reference network device supports the number of adaptive array radio antenna patterns, and wherein the plurality of directions associated with the supported number of adaptive array radio antenna patterns are predefined; and
determine a first relative orientation of another of the plurality of network devices relative to the orientation of the reference network device based on the two-dimensional matrix and the predefined plurality of directions associated with the number of adaptive array radio antenna patterns supported by the reference network device;
wherein the plurality of directions comprise four primary direction that are 90 degrees separated.

12. The non-transitory machine-readable storage medium of claim 11, wherein the two-dimensional matrix comprises a plurality of signal strength levels corresponding to signals received by the plurality of network devices.

13. The non-transitory machine-readable storage medium of claim 12, wherein a respective signal strength level corresponding to a particular network device and a particular available adaptive array radio antenna pattern in the two-dimensional matrix indicates a signal strength of a signal received by the particular network device when the particular network device operates using the particular available adaptive array radio antenna pattern.

14. The non-transitory machine-readable storage medium of claim 11, further comprising the instructions to:
determine a second relative orientation to the another network device from the plurality of network devices based at least on the two-dimensional matrix and the first relative orientation.

15. The non-transitory machine-readable storage medium of claim 11, further comprising the instructions to:
receive location information of the reference network device and the another network device from a global positioning system (GPS);
determine a respective reference adaptive array radio antenna pattern and a respective reference direction for the reference network device and the another network device based on the two-dimensional matrix;
estimate an expected signal strength level for a signal received by the reference network from the another network device based on the received location information, the respective adaptive array radio antenna pattern and the respective reference direction for the reference network device and the another network device; and
compare the expected signal strength level with an actual signal strength of the signal received by the reference network device from the another network device.

* * * * *